(12) United States Patent
Kech

(10) Patent No.: US 12,025,517 B2
(45) Date of Patent: Jul. 2, 2024

(54) PRESSURE SENSOR WITH A COMPENSATION UNIT AND METHOD FOR COMPENSATION

(71) Applicant: VEGA GRIESHABER KG, Wolfach (DE)

(72) Inventor: Günter Kech, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/741,532

(22) Filed: May 11, 2022

(65) Prior Publication Data

US 2022/0373420 A1   Nov. 24, 2022

(30) Foreign Application Priority Data

May 21, 2021   (DE) ...................... 10 2021 113 265.7

(51) Int. Cl.
 *G01L 27/00*  (2006.01)
 *G01D 3/036*  (2006.01)
 *G01L 9/12*   (2006.01)
 *G01L 19/04*  (2006.01)

(52) U.S. Cl.
 CPC ............ *G01L 19/04* (2013.01); *G01D 3/0365* (2013.01); *G01L 27/002* (2013.01)

(58) Field of Classification Search
 CPC ....................................... G01L 19/04
 See application file for complete search history.

(56) References Cited

U.S. PATENT DOCUMENTS

| 2004/0183550 | A1  |  9/2004 | Fehrenbach |             |
|--------------|-----|---------|------------|-------------|
| 2009/0293625 | A1* | 12/2009 | Sundet     | G01L 9/125  |
|              |     |         |            | 702/50      |
| 2010/0000316 | A1* |  1/2010 | Fehrenbach | G01F 23/00  |
|              |     |         |            | 73/304 C    |
| 2010/0139407 | A1* |  6/2010 | Dannhauer  | G01L 9/125  |
|              |     |         |            | 73/708      |

FOREIGN PATENT DOCUMENTS

| DE | 10044078     |  4/2002 |
| DE | 102004053884 |  4/2004 |
| DE | 102006050451 | 10/2006 |
| DE | 20321736     |  5/2009 |
| DE | 102010002157 |  2/2010 |
| DE | 102013217382 |  8/2013 |
| EP | 01442276     | 10/2002 |

OTHER PUBLICATIONS

GPTO office action for related German application 10 2021 113 265.7 issued on Feb. 5, 2022.

* cited by examiner

*Primary Examiner* — Herbert K Roberts
(74) *Attorney, Agent, or Firm* — William Gray Mitchell

(57) ABSTRACT

The invention relates to a pressure sensor and related method for the compensation of a pressure, wherein the pressure sensor has a pressure measuring cell, with a housing and an electronic sensor system and an electronic evaluation system disposed within the housing, as well as at least one first temperature sensor for measuring a first temperature and a second temperature sensor for measuring a second temperature, wherein the pressure sensor has a compensation unit connected to the at least two temperature sensors, and wherein the compensation unit determines a compensation for the pressure taking into account at least the first temperature and the second temperature.

8 Claims, 1 Drawing Sheet

PRESSURE SENSOR WITH A COMPENSATION UNIT AND METHOD FOR COMPENSATION

CROSS REFERENCE TO RELATED APPLICATIONS

This patent application claims priority to German Patent Application 102021113 265.7, filed on May 21, 2021.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a pressure sensor with a compensation unit and a method for compensation.

Background of the Invention

Pressure sensors are known from the prior art in a variety of configurations. For this purpose, pressure sensors have pressure measuring cells that convert a pressure into an electrical signal, which can then be processed further. Pressure measuring cells are classified based on the underlying measuring principle, the materials oriented towards the process as well as based on the capability of measuring absolute or relative pressures.

In this case, one of the measuring principles is based on a capacitance change, wherein a pressure change is measured with a capacitive pressure measuring cell based on a deformation of a diaphragm and a capacitance change resulting therefrom. In resistive pressure measuring cells, the deformation of a diaphragm is detected, for example, by means of a strain gauge, and a conclusion with respect to the pressure is drawn from a change in resistance of the strain gauges. Piezo-resistive pressure measuring cell utilize the piezo-electric effect for determining the pressure.

The distinction with regard to the materials oriented towards the process, i.e. the materials that come into contact with the process environment and the process media, is generally made between metallic and ceramic pressure measuring cells, wherein the ones have a metallic and the others a ceramic membrane.

Whether absolute or relative pressures can be measured is generally dependent on whether a rear side of a diaphragm is subjected to a second pressure, e.g. an external pressure, or whether the rear side of the diaphragm is evacuated.

On the whole, a plurality of components with different materials, which each have different coefficients of thermal expansion, are used for forming pressure measuring cells known from the prior art. Particularly in the case of pressure measuring cells which are exposed at their mounting location to large temperature fluctuations that, in part, occur within a short period of time, this may result in intrinsic stresses or internal deformations, particularly of the diaphragm. These temperature-induced intrinsic stresses may subsequently cause parasitic pressure signals and thus impact the measurement result.

Thus, temperature sensors are frequently integrated directly into the pressure measuring cell in order to compensate the static temperature error during the pressure measurement. If the pressure measuring cell is in a thermal equilibrium with its environment, the temperature dependence of the pressure measurement can be compensated by means of such a temperature sensor and a suitable post-processing of the measurement signal. Rapid changes of temperature may, however, result in considerable measurement errors.

It was found that the commonly used methods for a (temperature) compensation of a pressure sensor are often not sufficiently accurate and that the measured pressure cannot be sufficiently compensated for all applications.

It is therefore the underlying object of the invention to provide a pressure sensor and a method for compensation which enable a pressure compensation that is as simple as possible and even more accurate.

According to the invention, the object is achieved with the features of the independent claims. Other practical embodiments and advantages are described in connection with the dependent claims.

BRIEF SUMMARY OF THE INVENTION

In a preferred embodiment, a pressure sensor comprising: a pressure measuring cell and with a housing and an electronic sensor system and an electronic evaluation system disposed within the housing, wherein the pressure sensor has at least one first temperature sensor for measuring a first temperature and a second temperature sensor for measuring a second temperature, wherein the temperature sensors are disposed at different positions along an axial direction of the housing and are at different distances from a process fluid or medium, wherein the pressure sensor has a compensation unit connected to the at least two temperature sensors, and wherein the compensation unit is designed for determining a compensation taking into account at least the first temperature and the second temperature, wherein the pressure sensor has an input unit for inputting a piece of input information regarding:

an installation position of the pressure sensor on a container.
a medium to be subjected to a measurement,
a type of container, wherein the compensation unit is connected to the input unit, wherein the compensation unit is designed for determining a-the compensation of different temperatures and different thermally-induced deformations of the pressure sensor, thermal input dependent of the medium and its state of aggregation and/or temperature distribution influenced by the type and material of the container.

DETAILED DESCRIPTION OF THE INVENTION

Figure 1:
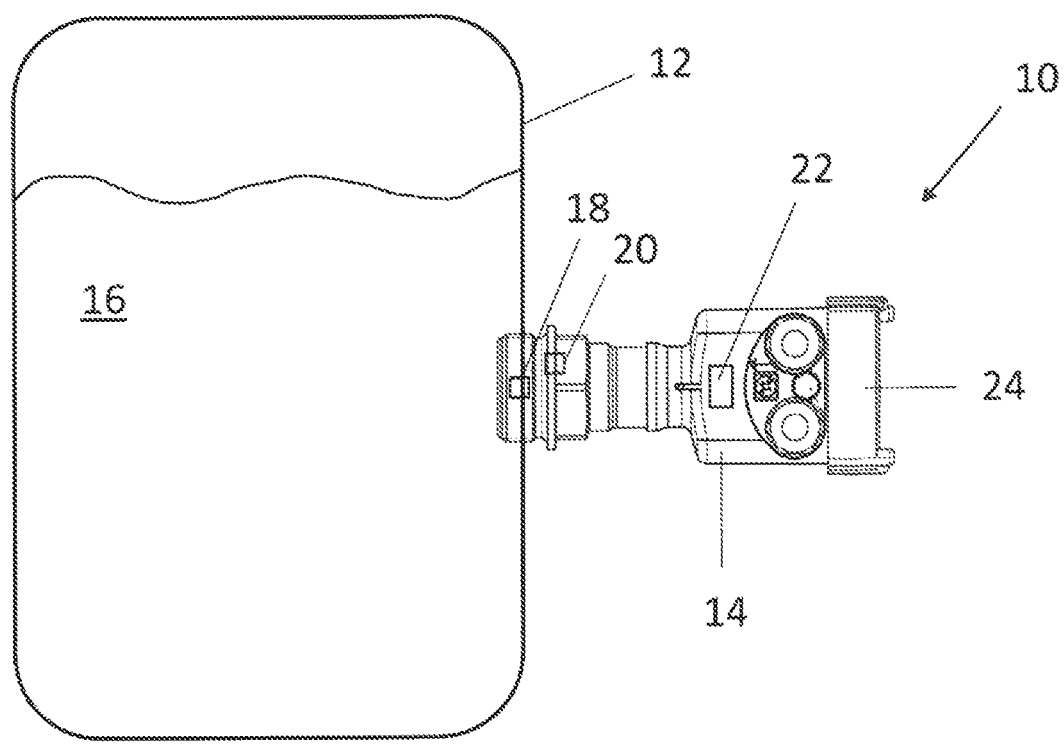
FIG. 1 is a schematic illustration of a pressure sensor according to the invention in an arrangement on a container.

A pressure sensor according to the invention comprises a pressure measuring cell for measuring a pressure. In this case, the pressure measuring cell may be a ceramic or metallic pressure measuring cell.

In addition, the pressure sensor comprises a housing in which an electronic sensor system is disposed. In particular, the electronic sensor system serves for converting the pressure into an electrical signal and for a first treatment of the electrical signal. In particular, the electronic sensor system is disposed directly adjacent to the pressure measuring cell. Moreover, an electronic evaluation system is disposed in the housing. The electronic evaluation system is connected to the electronic sensor system and receives the electrical signal generated the sensor unit. In particular, the electronic evaluation system serves for calculating the compensated measurement value and for forwarding the measurement value. In particular, the electronic evaluation system is disposed at the end of the pressure sensor facing away from the pressure measuring cell. The housing surrounds the electronic sensor system, the electronic evaluation system and also the pressure measuring cell and serves for protecting and connecting the pressure sensor. In particular, the housing has a process connection, such as a flange or threaded portion, for attaching the pressure sensor to a container or pipe.

The pressure sensor has at least one first temperature sensor for measuring a first temperature and a second temperature sensor for measuring a second temperature. Spaced apart along an axial direction of the housing, the temperature sensors are disposed at different positions and, accordingly, are at different distances from the process.

In addition, the pressure sensor has a compensation unit connected to the at least two temperature sensors. At least the first temperature and the second temperature are supplied to the compensation unit, and the compensation unit is designed in such a way that it determines a compensation taking into account the first temperature and the second temperature. In a compensation, an unwanted influence is canceled out by means of a correction. The compensation corresponds to a value by which the determined pressure has to be corrected or compensated in order to remove the pressure changes based purely on thermal or parasitic effects. A temperature compensation takes place by means of the measured temperatures. In this case, the compensation can be carried out by a separate compensation unit. As an alternative, the electronic evaluation system serves as a compensation unit, or a higher-level unit serves as a compensation unit.

On the whole, the pressure is determined in this case while taking into account all of the detected temperatures. In particular, changes in the pressure measuring cell, which are induced because of different thermal expansions or temperature gradients present in the pressure sensor, and which distort the pressure to be measured, can be detected particularly accurately by detecting several temperatures. Since all the temperatures are directly supplied to the compensation unit, the latter is able to determine the compensation particularly simply and rapidly. The compensation is carried out, in particular, using a look-up table determined in advance by means of calibration.

In particular, the pressure sensor comprises at least one further temperature sensor in addition to the first temperature sensor and the second temperature sensor. In particular, the pressure sensor comprises at least three temperature sensors, wherein the compensation unit is connected to the at least three temperature sensors, and wherein the compensation unit is designed for determining a compensation taking into account at least the first temperature, the second temperature and the third temperature. As is explained in more detail below, a particularly good compensation can be achieved by the targeted arrangement of the individual temperature sensors.

In a practical embodiment, at least one temperature sensor is arranged in the region of the pressure measuring cell, and particularly in the region of the diaphragm. This temperature sensor best reflects the temperature transferred to the pressure measuring cell by the process or medium.

In particular, at least one temperature sensor is disposed in the region of the electronic sensor system. In particular, the electronic sensor system is disposed in the housing, directly adjacent to the pressure measuring cell. The temperature of the electronic sensor system is impacted by the process temperature, the ambient temperature and also by the emitted heat released by the electronic components. The temperature present in the region of the electronic sensor system also affects the temperature distribution in the pressure sensor or the housing of the pressure sensor. If this temperature is also taken into account when compensating the temperature, this results in particularly accurate results.

In another practical embodiment of the pressure sensor, at least one temperature sensor is disposed in the region of the electronic evaluation system. In particular, the temperature sensor is disposed in a housing of the electronic evaluation system or directly on a circuit board of the electronic evaluation system. In particular, the electronic evaluation system is disposed in the housing at the end opposite the pressure measuring cell. In this region, the temperature is also affected by the environment and the emitted heat of the electronic components of the electronic evaluation system. Accordingly, the temperature at the electronic evaluation system also affects the pressure measurement. If the measured temperature of a temperature sensor arranged at the electronic evaluation system is supplied to the compensating device and taken into account in the compensation, the temperature compensation becomes even more accurate.

Furthermore, at least one temperature sensor can be disposed on the outside of the housing for detecting an ambient temperature. Additionally taking into account the ambient temperature also results in the compensation being improved. Alternatively or additionally, at least one temperature sensor may be arranged in a display unit and/or operating unit disposed on the housing.

Preferably, the pressure sensor has at least three temperature sensors arranged on the pressure measuring cell, the electronic sensor system and the electronic evaluation system. As an alternative for one of the temperature sensor, or additionally, another temperature sensor may be arranged on the outside of the housing. Thus, a particularly accurate and reliable compensation and pressure determination is realized.

In another practical embodiment of the pressure sensor according to the invention, the pressure sensor has an input unit for inputting a piece of input information regarding
 an installation position of the pressure sensor,
 a medium to be subjected to a measurement,
 a type of container, and/or
 a material of the container.

In this case, the input unit may be arranged directly on the pressure sensor, e.g. in the form of an operable display. Alternatively, the input unit may also be a mobile terminal or a higher-level unit, with the inputted input information being transmitted to the compensation unit in a wireless or wired manner. The compensation unit is connected, in a wireless or wired manner, to the input unit, and the compensation unit is designed such that it determines a compensation taking into account the input information.

The installation position of the pressure sensor on a container or pipe may also affect the pressure measurement and has to be compensated accordingly. The pressure sensor may be arranged at the top, the bottom or also laterally on a container or pipe. Depending on the installation position and also the effect of gravity connected therewith, different (thermally induced) deformations of the pressure sensor may occur, which also affect the pressure measurement.

As an alternative to inputting the installation position, this piece of information, for example, may also be determined by means of a position sensor. Due to the orientation of the pressure sensor relative to gravity, it is possible to determine by means of the position sensor whether the pressure sensor is arranged laterally on a container (horizontally), at the top or bottom of the container (vertically).

The compensation becomes even more accurate due to the input information. A medium to be subjected to a measurement may be input among other things. The medium may be oil, water or a gas or air, for example. The medium may be present in a certain state of aggregation, in particular gaseous or liquid. The medium and its state of aggregation also affect the compensation. For example, the point-shaped thermal input into the pressure measuring cell is lower in the case of gaseous media.

Alternatively or additionally, a type of container and/or a material of the container may also be inputted. A type of container may be, in particular, a tank, a pipe or an IBC container. The containers may be made from stainless steel or plastics, for instance. The containers may have an insulation. Among other things, the type and material of the container may have an influence on the temperature distribution in the pressure sensor and distort the pressure measurement accordingly.

In order to achieve an adaptation and determination of the compensation that is as fast as possible, compensation values determined in a calibration carried out in advance are stored in the pressure sensor, in particular.

The invention also relates to a method for compensation. A pressure sensor, particularly a pressure sensor as described above, has a compensation unit. At least one first temperature determined by the first temperature sensor and a second temperature determined by the second temperature sensor are supplied to the compensation unit, and the compensation unit determines a compensation taking into account at least the first temperature and the second temperature. In particular, the pressure sensor has at least two temperature sensors and preferably at least three temperature sensors. The temperatures of all temperature sensors are supplied to the compensation unit and the compensation is determined therefrom. In particular, the determination is carried out such that the pressure sensor is calibrated in advance, wherein compensation values are predefined for different parameter combinations of temperatures and, optionally, input information. If, during the use of the pressure sensor, certain temperatures are measured and if certain input information is optionally provided, then the compensation unit can draw upon previously determined compensation values (e.g. in a look-up table) and determine the current compensation of the temperature or other parasitic effects. In particular, the compensation values are stored in the pressure sensor.

By taking into account at least two determined temperatures, and preferably at least three temperatures, the determined compensation is particularly accurate.

As was already described above, the compensation unit may be supplied with an installation position of the pressure sensor on a container, and the compensation is determined also taking into account the installation position.

The compensation unit may also be supplied with a piece of information regarding the medium of the pressure sensor to be subjected to a measurement, and the compensation is also determined taking into account the medium.

It may also be provided that information about properties of the container is supplied to the compensation unit and the compensation is determined also taking into account the properties of the container.

In particular, the information about the installation position, the medium and the properties of the container can be inputted by a user in a situation-specific manner via an input unit. In particular, the information is transmitted to the compensation unit in a wireless or wired manner. Alternatively, the installation position may be determined by a position sensor, for example, and transmitted to the compensation unit.

Based on the temperatures and the input information, the compensation unit determines the compensation in order to measure as correct a pressure as possible.

DETAILED DESCRIPTION OF THE FIGURES

FIG. 1 shows a pressure sensor 10. The pressure sensor 10 is arranged laterally on a container 12.

The pressure sensor 10 has a housing 14. A pressure measuring cell (not visible) is arranged in the housing 14 at the end facing towards the process. The pressure measuring cell is in contact with the liquid 16 disposed in the container 12 and serves for detecting the pressure in the container 12.

Moreover, an electronic sensor system (not visible) is disposed in the housing 14. The electronic sensor system is disposed in the housing 14, adjacent to the pressure measuring cell.

An electronic evaluation system (not visible) is disposed in the housing 14 at the end of the housing 14 opposite the pressure measuring cell. The electronic evaluation system is arranged in a region of the housing 14 located outside the container 12.

Moreover, the pressure sensor 10 has three temperature sensors 18, 20, 22. The arrangement of the respective temperature sensors 18, 20, 22 is schematically indicated by rectangles. The temperature sensors 18, 20, 22 are distributed in the axial direction of the housing 14 and are each at different distances from the process, or in this case from the liquid 16.

The first temperature sensor 18 for measuring a first temperature is disposed directly on the pressure measuring cell itself. The second temperature sensor 20 for measuring a second temperature is arranged in the region of the electronic sensor system, and the third temperature sensor 22 for measuring a third temperature is arranged in the region of the electronic evaluation system. All three temperature sensors are arranged within the housing 14.

A fourth temperature sensor may also be disposed on the outside of the housing 14 for detecting a fourth temperature (the ambient temperature).

The pressure sensor 10 further has an input unit 24. This is a display with a touch function, which is disposed at the end of the housing 14. Via the input unit 24, input information E about the installation position of the pressure sensor 10 (in this case: horizontally and laterally of the container 12),
the medium 16 (in this case: water in a liquid state of aggregation),
the properties of the container 12 (in this case: an IBC tank made of plastic)
may be inputted.

Moreover, the pressure sensor 10 has a compensation unit 26 by means of which the above-mentioned information is used for determining a compensation.

Figure 2:
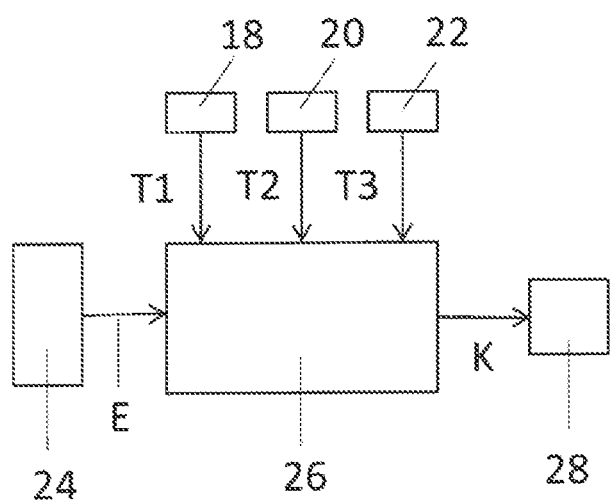
FIG. 2 is a schematic illustration of a block circuit diagram for determining the compensation.

A corresponding method is schematically illustrated in FIG. 2. FIG. 2 illustrates the compensation unit 26. The first temperature T1 of the first temperature sensor 18, the second temperature T2 of the second temperature sensor 20 and the third temperature T3 of the third temperature sensor 22 are supplied to the compensation unit 26. Moreover, the above-mentioned input information E of the input unit 24 is transmitted to the compensation unit 26. The temperatures T1, T2, T3 and the input information E may be transmitted in a wireless or wired manner.

Based on the temperatures T1, T2, T3 and the input information E, the compensation unit 26 determines a compensation K, which is transmitted to the electronic evaluation system or a higher-level unit 28. In the process, the compensation unit 26 can draw upon compensation values previously determined in tests. Parasitic temperature effects and other parasitic influences on the pressure can be compensated by means of the determined compensation.

LIST OF REFERENCE NUMBERS

10 Pressure sensor
12 Container
14 Housing
16 Medium
18 First temperature sensor
20 Second temperature sensor
22 Third temperature sensor
24 Input unit
26 Compensation unit
28 Higher-level unit
T1 First temperature
T2 Second temperature
T3 Third temperature
E Piece of input information
K Compensation value The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

It must be noted that the features cited individually in the claims can be combined with each other in any technologically meaningful manner (also across the boundaries of categories, such as method and device) and represent other embodiments of the invention. The description, in particular in connection with the figures, additionally characterizes and specifies the invention.

It may also be noted that a conjunction "and/or" used hereinafter, which is situated between two features and links them to each other, should always be interpreted such that, in a first embodiment of the subject matter according to the invention, only the first feature may be provided, in a second embodiment, only the second feature may be provided, and in a third embodiment, both the first and the second feature may be provided.

I claim:

1. A pressure sensor comprising: a pressure measuring cell and with a housing and an electronic sensor system and an electronic evaluation system disposed within the housing, wherein the pressure sensor has at least one first temperature sensor for measuring a first temperature and a second temperature sensor for measuring a second temperature, wherein the temperature sensors are disposed at different positions along an axial direction of the housing and are at different distances from a process fluid or medium, wherein the pressure sensor has a compensation unit connected to the at least two temperature sensors, and wherein the compensation unit is designed for determining a compensation taking into account at least the first temperature and the second temperature, wherein the pressure sensor has an input unit for inputting a piece of input information regarding:
an installation position of the pressure sensor on a container,
a medium to be subjected to a measurement, and/or
a type of container,
wherein the compensation unit is connected to the input unit, wherein the compensation unit is designed for determining the compensation of different temperatures and different thermally-induced deformations of the pressure sensor, thermal input dependent of the medium and its state of aggregation and/or temperature distribution influenced by the type and material of the container.

2. The pressure sensor of claim 1, wherein the pressure sensor further comprises at least a third temperature sensor, wherein the compensation unit is connected to the at least three temperature sensors, and wherein the compensation unit is designed for determining a compensation taking into account at least the first temperature, the second temperature and a third temperature.

3. The pressure sensor of claim 1, wherein at least one of the first or second temperature sensor is disposed in a region of the electronic sensor system.

4. The pressure sensor of claim 1, wherein at least one of the first or second temperature sensor is disposed in a region of the electronic evaluation system.

5. The pressure sensor of claim 1, wherein at least one of the first or second temperature sensor is disposed on an outside of the housing for detecting an ambient temperature.

6. The pressure sensor of claim 1, wherein compensation values determined in a calibration carried out in advance are stored in the pressure sensor.

7. A method for compensation, using a pressure sensor comprising a compensation unit, such method comprising the following steps:
1. determining at least one first temperature with a first temperature sensor and a second temperature with a second temperature sensor;
2. supplying the at least one first temperature and the second temperature to the compensation unit; and
3. determining a compensation with the compensation unit, such compensation taking into account at least the first temperature and the second temperature;
wherein the compensation unit is supplied with a piece of input information about:
an installation position of the pressure sensor on a container,
a medium to be subjected to a measurement, a type of container, and/or a material of the container, and the determination of the compensation of different temperatures and different thermally-induced deformations of the pressure sensor, thermal input dependent of the medium and its state of aggregation and/or temperature distribution influenced by the type and material of the container is also carried out.

8. The method of claim 7, wherein compensation values are determined in a calibration and stored in advance, and the compensation unit draws upon the stored compensation values when determining the compensation.

\* \* \* \* \*